United States Patent
Sarnoff et al.

(10) Patent No.: US 8,837,541 B2
(45) Date of Patent: Sep. 16, 2014

(54) METHODS FOR MANUFACTURING AND USING SOLID STATE LASER SYSTEMS HAVING CLADDED LASING MATERIALS

(75) Inventors: Burton E. Sarnoff, Aspers, PA (US); Donald Heller, Somerset, NJ (US); Jerzy Krasinski, Stillwater, OK (US)

(73) Assignee: Light Age, Inc., Somerset, NJ (US)

( * ) Notice: Subject to any disclaimer, the term of this patent is extended or adjusted under 35 U.S.C. 154(b) by 34 days.

(21) Appl. No.: 13/455,929

(22) Filed: Apr. 25, 2012

(65) Prior Publication Data

US 2013/0287052 A1 Oct. 31, 2013

(51) Int. Cl.
*H01S 3/04* (2006.01)
*H01S 3/14* (2006.01)

(52) U.S. Cl.
USPC .................................. 372/34; 372/35; 372/39

(58) Field of Classification Search
USPC ........................................ 372/6, 34, 35, 39
See application file for complete search history.

(56) References Cited

U.S. PATENT DOCUMENTS

| | | |
|---|---|---|
| 3,684,980 A | 8/1972 | Kay |
| 3,755,757 A * | 8/1973 | Woodcock ...................... 372/40 |
| 5,479,430 A | 12/1995 | Shine, Jr. et al. |
| 5,664,040 A | 9/1997 | Kramer et al. |
| 6,999,481 B1 | 2/2006 | Jurgensen |
| 2001/0025650 A1 | 10/2001 | Ando et al. |
| 2004/0052284 A1 | 3/2004 | Krause et al. |
| 2004/0052481 A1 | 3/2004 | Seguin et al. |
| 2008/0279080 A1 | 11/2008 | Tabata et al. |
| 2012/0020631 A1 | 1/2012 | Rinzler et al. |

OTHER PUBLICATIONS

International Search Report issued in International Appln. No. PCT/US2012/035007 mailed Aug. 6, 2012.

* cited by examiner

*Primary Examiner* — Armando Rodriguez
(74) *Attorney, Agent, or Firm* — Greenberg Traurig, LLP

(57) ABSTRACT

In one embodiment, the instant invention is an optical structure that includes: an optical active medium of a solid state laser, where the optical active medium has a first coefficient of thermal expansion; and a protective structure that is directly cladded a portion of the optical active medium, where the protective structure has a second coefficient of thermal expansion which matches the first coefficient of thermal expansion of the optical active medium, and where the protective structure is transparent to a wavelength that is within an absorption band of the optical active medium so that the optical structure has: the optical active medium that is protected from a physical damage, and the optical active medium that is capable of generating a laser beam having a first energy that is larger than a second energy generated by a control optical structure having the optical active medium without the protective structure.

19 Claims, 3 Drawing Sheets

METHODS FOR MANUFACTURING AND USING SOLID STATE LASER SYSTEMS HAVING CLADDED LASING MATERIALS

TECHNICAL FIELD

The instant invention relates to methods for manufacturing and using devices incorporating cladded solid state laser materials.

BACKGROUND

A typical arrangement of a solid state laser is a cylindrical crystal (also known as a laser rod) with polished faces and one or more lamp sources, such as Xenon flashlamps or laser diodes or other incoherent light sources, providing pumping energy directed at the laser rod. The optically excited laser rod generates and amplifies the lasing energy. A laser resonator is formed by positioning mirrors at either end of the laser rod. A portion of the lasing energy (laser beam) is transmitted through a partially reflective mirror at one end of the laser resonator.

SUMMARY OF INVENTION

In some embodiments, the instant invention can provide an optical structure that includes at least the following components: an optical active medium of a solid state laser, wherein the optical active medium has a first coefficient of thermal expansion; and at least one protective structure that is directly cladded at least a portion of an outside surface of the optical active medium, where the at least one protective structure has a second coefficient of thermal expansion which sufficiently matches the first coefficient of thermal expansion of the optical active medium of the solid state laser, and where the at least one protective structure is sufficiently transparent to at least one wavelength, wherein the at least one wavelength is within at least one absorption band of the optical active medium of the solid state laser; hereby resulting in the optical structure of the solid state laser having: i) the optical active medium of the solid state laser that is protected from a physical damage when the optical active medium of the solid state laser is heated to a temperature above 80 degrees Celsius, where the physical damage renders the optical active medium of the solid state laser inoperable, and ii) the optical active medium of the solid state laser that is capable of generating a laser beam having a first energy that is larger than a second energy generated by a control optical structure that includes the optical active medium of the solid state laser without the at least one protective structure.

In some embodiments, the at least one protective structure can be a thermal insulator. In some embodiments, the at least one protective structure can be sufficiently water-resistant at the temperature above 80 degrees Celsius. In some embodiments, the at least one protective structure seals at least one surface of the optical active medium of the solid state laser. In some embodiment, the at least one protective structure contacts an entire portion of the outside surface of the optical active medium of the solid state laser. In some embodiments, the at least one protective structure is created when at least one protective composition is deposited onto the optical active medium of the solid state laser.

In some embodiments, the at least one protective structure is created when at least one protective composition having a semi-fluid character wets the at least portion of the optical active medium of the solid state laser when the at least one protective composition is drawn over the at least portion of the optical active medium of the solid state laser. In some embodiments, the at least one protective structure includes at least one protective composition having one or more glass or glass-like properties.

In some embodiments, the optical active medium of the solid state laser includes a laser crystal. In some embodiments, the laser crystal can be selected from the group consisting of: alexandrite, Cr:LiSAF, Cr:LiCAF, Nd:YAG, NdCrYAG, Er:YAG, Nd:YLF, Ti:sapphire, Nd:YVO4, Nd:Y-COB, Nd:Glass, Tm:YAG, Yb:YAG, Ytterbium:2O3 (glass or ceramics), Ho:YAG, Cr:ZnSe, Promethium 147 doped phosphate glass (147Pm+3:Glass), Erbium doped and erbium-ytterbium codoped glass, U:CaF2, and Sm:CaF2.

In some embodiments, the instant invention can provide an optical system that at least includes an optical structure that includes at least the following components: an optical active medium of a solid state laser, wherein the optical active medium has a first coefficient of thermal expansion; and at least one protective structure that is directly cladded at least a portion of an outside surface of the optical active medium, where the at least one protective structure has a second coefficient of thermal expansion which sufficiently matches the first coefficient of thermal expansion of the optical active medium of the solid state laser, and where the at least one protective structure is sufficiently transparent to at least one wavelength, wherein the at least one wavelength is within at least one absorption band of the optical active medium of the solid state laser; hereby resulting in the optical structure of the solid state laser having: i) the optical active medium of the solid state laser that is protected from a physical damage when the optical active medium of the solid state laser is heated to a temperature above 80 degrees Celsius, where the physical damage renders the optical active medium of the solid state laser inoperable, and ii) the optical active medium of the solid state laser that is capable of generating a laser beam having a first energy that is larger than a second energy generated by a control optical structure that includes the optical active medium of the solid state laser without the at least one protective structure.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

Figure 1:
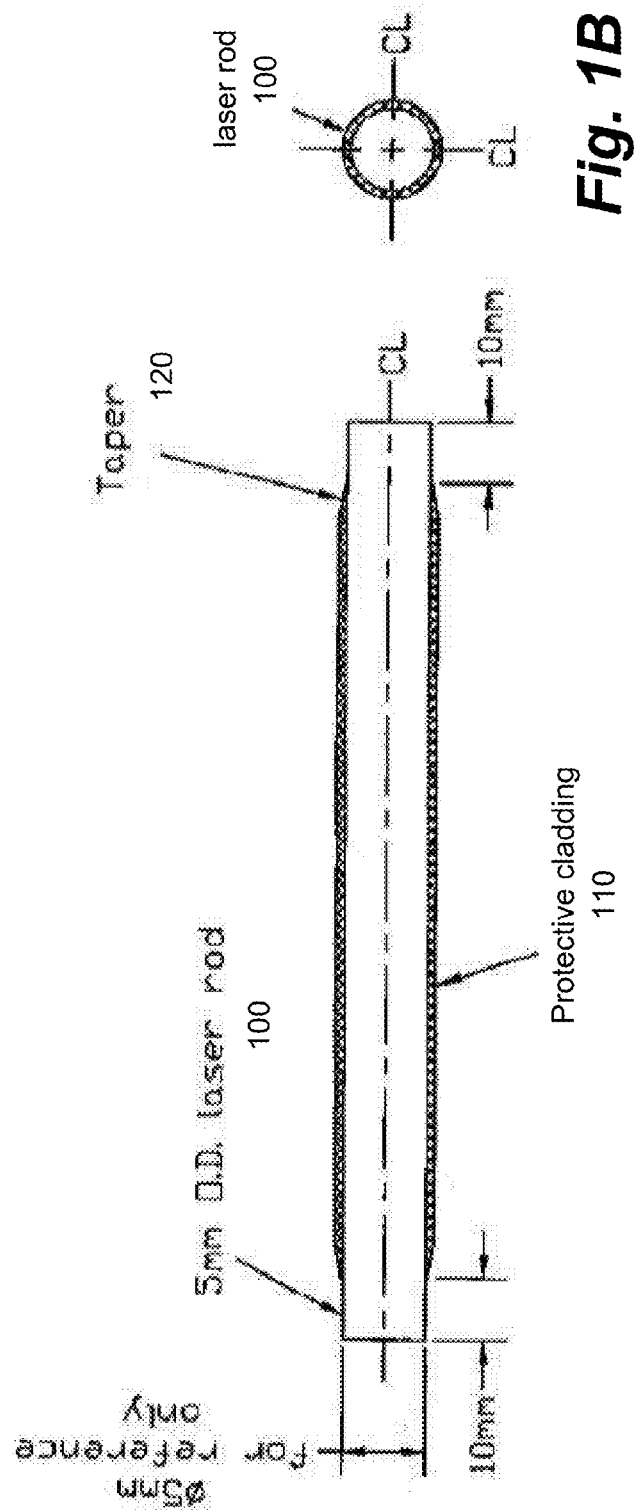
FIGS. 1A and 1B show an embodiment of the instant invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Further, as used herein, 1 um=1 μm=1 micrometer=$1 \times 10^{-6}$ meter (m).

For purposes of this description, the terms "optical gain media(um)," "optical active media(um)," "optical laser media (um)," "active laser medium," "gain media(um)," "active media(um)," "optical lasing media(um)," and "lasing media (um)" refer to the same thing which behaves as a source of optical gain (i.e., a measure of the ability of the media(um) to increase the power and/or amplitude of a signal from the input to the output) within a laser. The gain typically results from the stimulated emission of electronic or molecular transitions to a lower energy state from a higher energy state previously populated by a pump source (i.e., laser pumping). Laser pumping is typically an act of energy transfer from an external source into the gain medium of a laser. The energy is typically absorbed in the medium, producing excited states in its atoms. When the number of particles in one excited state exceeds the number of particles in the ground state or a less-excited state, population inversion is typically achieved. In this condition, the mechanism of stimulated emission can take place and the medium can act as a laser or an optical amplifier. The pump power must be typically higher than the lasing threshold of the laser.

Further, for purposes of this disclosure, the terms "fluid," "water," "aqueous", "solution," "environment" may include, but not limited to, a portion of or be fully composed of a liquid or gaseous medium/environment, including the atmosphere.

Solid state lasers are constructed using a gain/active medium (such as laser crystals) mounted so that optical pumping energy is incident upon the gain/active medium. In some embodiments, the solid state lasers of the instant invention can utilize, but not limited to, the following crystals:

Nd:YAG,
NdCrYAG,
Er:YAG,
Neodymium YLF (Nd:YLF),
Neodymium doped Yttrium orthovanadate (Nd:YVO4),
Neodymium doped yttrium calcium oxoborate Nd:YCa40 (BO3)3 or simply Nd:YCOB,
Neodymium glass (Nd:Glass),
Titanium sapphire (Ti:sapphire),
Thulium YAG (Tm:YAG),
Ytterbium YAG (Yb:YAG),
Ytterbium:2O3 (glass or ceramics),
Ytterbium doped glass laser (rod, plate/chip, and fiber;
Holmium YAG (Ho:YAG),
Chromium ZnSe (Cr:ZnSe),
Cerium doped lithium strontium (or calcium) aluminum fluoride (Ce:LiSAF, Ce:LiCAF),
Promethium 147 doped phosphate glass (147Pm+3:Glass) (e.g., 147Pm doped into a lead-indium-phosphate glass).
Chromium doped chrysoberyl (hereafter referred herein as alexandrite);
Erbium doped and erbium-ytterbium codoped glass,
Trivalent uranium doped calcium fluoride (U:CaF2), and
Divalent samarium doped calcium fluoride (Sm:CaF2), and other similarly suitable crystals.

In some embodiments, the instant invention allows to operate certain optical crystals, for example alexandrite and/or other solid state laser crystals, at elevated temperatures to achieve with various desirable features such as longer tuning range, access to shorter q-switched pulse lengths and others. For example, some of properties, operations, and uses of optical crystals such as alexandrite in the solid state laser systems are described in "Chapter 4: Alexandrite Lasers," "Handbook of solid-state lasers," edited by Peter K. Cheo, published by Marcel Dekker, Inc, ISBN 0-8247-7857-X, which specific disclosures are incorporated by reference herein in theirs entirety for all purposes set above.

In some embodiments, the instant invention provides optical structures in which gain media such as laser crystals is cladded with a protective cladding that protects the cladded gain media from a physical damage that can include, but not limited to, dissolution, cracking, and breaking down when the active medium is heated, rendering the optical structure and the active medium unusable for their intended purpose(s) and/or inoperable. In some embodiments, the physical damage of the gain media and/or the protective cladding can be determined through a visual observation. In some embodiments, the physical damage of the gain media and/or the protective cladding can be determined indirectly based on changes (physical and/or operational) of the gain media and/or the protective cladding and environment(s) that surround (s) the gain media and/or the protective cladding.

For purposes of this invention, terms "cladded" and "cladding" refer to a process that creates mechanical and/or chemical bonding between two materials. Consequently, for purposes of this invention, term "cladded gain media," "protective cladding," and similar terms mean that mechanical and/or chemical bonding has been created between gain media and at least one material, the protective cladding material, that at least partially surrounds the gain media.

In some embodiments, the instant invention allows the temperature of a solid-state laser gain material to be regulated to higher internal temperatures than its surroundings might otherwise permit. For example, the instant invention allows to regulate the internal temperature of the gain material at temperatures near or higher than the boiling point of water, when water is used as a heat removal fluid, as typically is the case in some commercial laser systems. In another example, the instant invention allows for improved internal temperature moderation, because the protective cladding isolates the gain material from outside thermal fluctuations occurring on timescales shorter than the heat transport time across the cladding which can help to stabilize laser output power and mode structure.

In some embodiments, the protective cladding of the instant invention can decrease mechanical stresses and their gradients, as well as thermal gradients, internal to the gain medium. For example, in some embodiments, the protective cladding can help to make the thermal boundary condition more uniform and the cladded material may be more mechanically compliant which can reduce cracking of the gain medium under pumped conditions and/or reduce at least some negative effects such as, but not limited to, stress or thermally induced birefringence. The thermally induced birefringence can result in asymmetric optical loss and depolarization of the laser beam, degrading laser performance.

In some embodiments, the instant invention provides the optical structure in which the protective cladding substantially matches the optical medium's coefficient of thermal expansion so that the protective cladding preserves its physical integrity when the active medium expands due to being heated when the optical medium is pumped with a light having at least one wavelength which is within at least one absorption band of the optical active medium.

In some embodiments, the active medium can be heated as of result of various direct heating techniques—i.e., heating occurs when the optically active media is directly connected to a source of heat energy (e.g., the optically active media is connected to a material that being heated, an electrical current being passed through the optically active media). In some embodiments, the active medium can be heated as of result of various indirect heating techniques such as, but not limited to, resonant magnetic induction, electromagnetic radiation (e.g., microwave radiation), and other similar techniques.

In some embodiments, the instant invention allows to improve the performance of solid state laser systems by, for example, protecting water-soluble laser crystals (e.g., Nd:YLF) from dissolving when immersed in water used, for example, for temperature stabilization and/or control.

In some embodiments, the instant invention allows to improve the performance of solid state laser systems by providing an improved mechanical mounting arrangement for laser gain medium. In some embodiments, the instant invention permits water-tight and/or air-tight seals to be made to the laser gain medium directly or by sealing to the protective cladding, especially in some cases when the gain medium lacks strength, is soft, or is water soluble.

For example, in some embodiments, if the protective cladding of the instant invention is sufficiently thick (e.g., on the order of about 0.5 mm) and is applied continuously, and/or proximal to, and/to flush with the end faces of a laser gain medium rod along the barrel of the rod; a mechanical mounting of the protected laser crystals can be achieved by sealing to the annulus of the cladding on the rod end, instead of sealing directly to the rod end face. In such embodiments, the instant invention can increase the available aperture, since the ends of the laser rod are not optically obscured by a mechanical seal, and thus increase a number of photons available for optical pumping—since photons absorbed by the outer edges of the rod constructed/installed without the instant invention would have been lost due to the aperture restriction imposed by an annular seal on the rod end face.

In some embodiments, the instant invention allows to improve the performance of solid state laser systems by extending a tuning range since the protective cladding can insulate the laser gain medium from a circulating water in the heating loop; thus allowing the laser gain material to operate at a temperature greater than the practical limit if the laser medium heated to a temperature above water's boiling point temperature would be directly exposed to water.

In some embodiments, the protective cladding can insolate the optical medium from potentially hostile environments (e.g., coolant, etc) while allowing the optical medium to operate at desired condition(s) (e.g., an elevated temperature).

In some embodiments, a composition of the protective cladding is determined based at least on a requirement that the protective cladding to be transparent to a light having at least one wavelength which is within at least one absorption band of the optical active medium.

In some embodiments, the instant invention provides the protective cladding that covers at least about 50(%) percent of the pumping surface area of the optically active medium. As used herein, the pumping surface area is an area through which the optical active medium receives a light having at least one wavelength which is within at least one absorption band of the optical active medium. In some embodiments, the instant invention provides the protective cladding that covers at least about 60(%) percent of the pumping surface area of the optically active medium. In some embodiments, the instant invention provides the protective cladding that covers at least about 70(%) percent of the pumping surface area of the optically active medium. In some embodiments, the instant invention provides the protective cladding that covers at least about 80(%) percent of the pumping surface area of the optically active medium. In some embodiments, the instant invention provides the protective cladding that covers at least about 90(%) percent of the pumping surface area of the optically active medium. In some embodiments, the instant invention provides the protective cladding that covers at least about 100(%) percent of the pumping surface area of the optically active medium.

In some embodiments, the instant invention provides the protective cladding that covers between about 50(%) percent to about 100(%) percent of the pumping surface area of the optically active medium. In some embodiments, the instant invention provides the protective cladding that covers between about 50(%) percent to about 90(%) percent of the pumping surface area of the optically active medium. In some embodiments, the instant invention provides the protective cladding that covers between about 75(%) percent to about 100(%) percent of the pumping surface area of the optically active medium. In some embodiments, the instant invention provides the protective cladding that covers between about 75(%) percent to about 95(%) percent of the pumping surface area of the optically active medium.

In some embodiments, the instant invention provides the protective cladding that has an ability to wet the optical active medium so as to maintain a seal—i.e., to prevent a gap forming between the protective sheath and the optically active medium. Having the gap precludes satisfactory mounting of the optically active medium within a device and can lead to undesirable reflective loss(es) caused by an introduction of additional optical surface(s).

In some embodiments, the instant invention provides the protective cladding that has a coefficient of thermal expansion that is sufficiently equivalent to (i.e., sufficiently matches to preserve the desired operational characteristic(s)) to that of the optical active medium (e.g., laser crystals) —i.e., the coefficient of thermal expansion of the protective sheath/cladding is within about 10(%) percent deviation from a coefficient of thermal expansion of the optical active medium. In some embodiments, the coefficient of thermal expansion of the protective sheath/cladding is within about 5(%) percent deviation from a coefficient of thermal expansion of the optical active medium. In some embodiments, the coefficient of thermal expansion of the protective sheath/cladding is within about 3(%) percent deviation from a coefficient of thermal expansion of the optical active medium. In some embodiments, the coefficient of thermal expansion of the protective sheath/cladding is less than about 1(%) percent deviation from a coefficient of thermal expansion of the optical active medium. In some embodiments, the coefficient of thermal expansion of the protective sheath/cladding deviates between about 1(%) percent to about 10(%) percent from a coefficient of thermal expansion of the optical active medium. In some embodiments, the coefficient of thermal expansion of the protective sheath/cladding deviates between about 1(%) percent to about 5(%) percent from a coefficient of thermal expansion of the optical active medium. In some embodiments, the coefficient of thermal expansion of the protective sheath/cladding deviates between about 0(%) percent to about 5(%) percent from a coefficient of thermal expansion of the optical active medium.

In some embodiments, the protective cladding is sufficiently transparent to a light having at least one wavelength which is within at least one absorption band of the optical active medium so that the protective cladding does not significantly impede the process of pumping the optical active medium by, for example, the light generated by one or more flashlapms. In some embodiment, the protective cladding is sufficiently transparent when the protective cladding transmits over 85% of at least one wavelength which is within at least one absorption band of the optical active medium. In some embodiment, the protective cladding is sufficiently transparent when the protective cladding transmits over 90% of at least one wavelength which is within at least one absorption band of the optical active medium. In some embodiment, the protective cladding is sufficiently transparent when the protective cladding transmit over 95% of at least one wavelength which is within at least one absorption band of the optical active medium. In some embodiment, the protective cladding is sufficiently transparent when the protective cladding transmits over 99% of at least one wavelength which is within at least one absorption band of the optical active medium. In some embodiment, the protective cladding is sufficiently transparent when the protective cladding transmits 100% of at least one wavelength which is within at least one absorption band of the optical active medium.

In some embodiment, the protective cladding is sufficiently transparent when the protective cladding transmits between 85% and 100% of at least one wavelength which is within at least one absorption band of the optical active medium. In some embodiment, the protective cladding is sufficiently transparent when the protective cladding transmits between 90% and 100% of at least one wavelength which is within at least one absorption band of the optical active medium. In some embodiment, the protective cladding is sufficiently transparent when the protective cladding transmits between 95% and 100% of at least one wavelength which is within at least one absorption band of the optical active medium. In some embodiment, the protective cladding is sufficiently transparent when the protective cladding transmits between 99% and 100% of at least one wavelength which is within at least one absorption band of the optical active medium.

In some embodiment, in addition to having the suitable coefficient of thermal expansion and being sufficiently transparent, the protective cladding can perform as a thermal insulator. In some embodiments, the protective cladding is sufficiently thick to sufficiently perform as the thermal insulator without negatively effecting other desired properties in accordance the instant invention. For example, the sufficient thickness would not negatively effect the sufficiently transparency of the protective cladding to light having at least one wavelength which is within at least one absorption band of the optical active medium.

In some embodiments, the protective cladding does not interfere with abilities to control operational condition(s) of the optically active media. In some embodiments, the protective cladding does not interfere with an ability to elevate the temperature of the optical active medium by one or more of the direct or indirect heating techniques.

In some embodiments, the instant invention allows to operate certain optical crystals, for example alexandrite and similar crystals, at elevated temperatures above at least about 90 degrees Celsius without negative effects to the physical integrity of laser crystals (e.g., preventing dissolution, cracking, etc.) In some embodiments, the instant invention allows to operate certain optical crystals, for example alexandrite and similar crystals, at elevated temperatures above at least about 100 degrees Celsius without negative effects to the physical integrity of laser crystals. In some embodiments, the instant invention allows to operate certain optical crystals, for example alexandrite and similar crystals, at elevated temperatures above at least about 120 degrees Celsius without negative effects to the physical integrity of laser crystals. In some embodiments, the instant invention allows to operate certain optical crystals, for example alexandrite and similar crystals, at elevated temperatures above at least about 250 degrees Celsius without negative effects to the physical integrity of laser crystals.

In some embodiments, the instant invention allows to operate certain optical crystals, for example alexandrite and similar crystals, at elevated temperatures between about 90 to about 250 degrees Celsius without negative effects to the physical integrity of laser crystals. In some embodiments, the instant invention allows to operate certain optical crystals, for example alexandrite and similar crystals, at elevated temperatures between about 90 to about 300 degrees Celsius without negative effects to the physical integrity of laser crystals. In some embodiments, the instant invention allows to operate certain optical crystals, for example alexandrite and similar crystals, at elevated temperatures between about 90 to about 500 degrees Celsius without negative effects to the physical integrity of laser crystals.

In some embodiments, the protective cladding can be applied to the optically active media by a vacuum cladding technique or any similarly suitable cladding and/or deposition technique.

ILLUSTRATIVE EXAMPLES OF SOME EMBODIMENTS OF THE INSTANT INVENTION

Example 1

As shown in FIGS. 1A and 1B, in some embodiments, the optical active/gain medium can be laser crystal(s) (e.g., alexandrite or alexandrite-like) in a form of a laser rod (100) having an outer diameter (O.D.) of approximately 5 mm without the protective sheath/cladding (110). In some embodiments, the protective cladding (110) can be made from a composition of one or more glass or glass-like substances and have an average thickness of about 0.5 mm (millimeters). In some embodiments, the instant invention provides an application of the protective cladding (110) by a vacuum cladding technology or any similarly suitable cladding and/or deposition technology. In some embodiments, the protective cladding (110) can be fire polished and/or additionally finished to perform in accordance with the above described principle(s) of the instant invention.

In some embodiments, the protective cladding (110) can protect the laser gain medium (100) from being in the direct contact with a water that can be used to heat and/or to cool the laser gain medium (100) during the operation of the laser. In some embodiments, the composition of the protective cladding (110) has wetting characteristics that allows the protective cladding (110) to spread over and adhere to a desired surface area of the optically active media in accordance with the above described principle(s) of the instant invention. In some embodiments, the composition of the protective cladding (110) has thermal expansion coefficient that is comparable to a thermal expansion coefficient of the laser rod (100), in accordance with the above described principle(s) of the instant invention.

As shown in FIG. 1A, in some embodiments, the laser rod (100) can have a length of at least about 115 mm. As shown in FIG. 1A, in some embodiments, the protective cladding (110) can cover a certain portion of the laser rod (100) and do not cover the laser rod (100) entirely. For example, as shown in FIG. 1A, the laser rod (100) has about 10 mm from each of its two sides free from the protective cladding (110). In some embodiments, the free-from-protective-cladding portions can allow for mounting hardware that secures the laser rod (100) in the laser system.

As shown in FIG. 1A, in some embodiments, the protective cladding (110) can have tapered portion(s) or taper(s) (120) at one or both ends of the laser rod (100). The taper(s) (120) (s) are inclined surface(s) of the protective cladding (110), thinning from the outside surface of the protective cladding (110) to an outside surface of the laser rod (100). In some embodiments, taper(s) (120) can incline at a taper angle between about 70 and about 80 degrees. The taper angle is an angle between a first plane parallel to a longitudinal axis of the laser rod (100) and a second plane which is perpendicular to the longitudinal axis of the laser rod (100). In some embodiments, the taper(s) (120) can incline at a taper angle of at least about 70 degrees.

In some embodiments, a thinner end of the taper(s) (120) (i.e., the one that is closer to the outside surface of the laser rod (100)) can terminate in a so-called step—a perpendicular drop to the outside surface of the laser rod (100), —having a height of about 50 micron. In some embodiments, the height of the so-called step is less than about 50 microns.

As shown in FIG. 1A, in some embodiments, having the taper(s) (120) allows the laser rod (110) to be mounted with conventional rod mounting equipment. Some embodiments of Example 1 provide the protective cladding (110) that have anti-reflective properties and that thermally insolates the laser rod (110), enhancing operational capabilities of the laser rod (110) in accordance with the abode discussed principles of the instant invention.

Example 2

Figure 2:
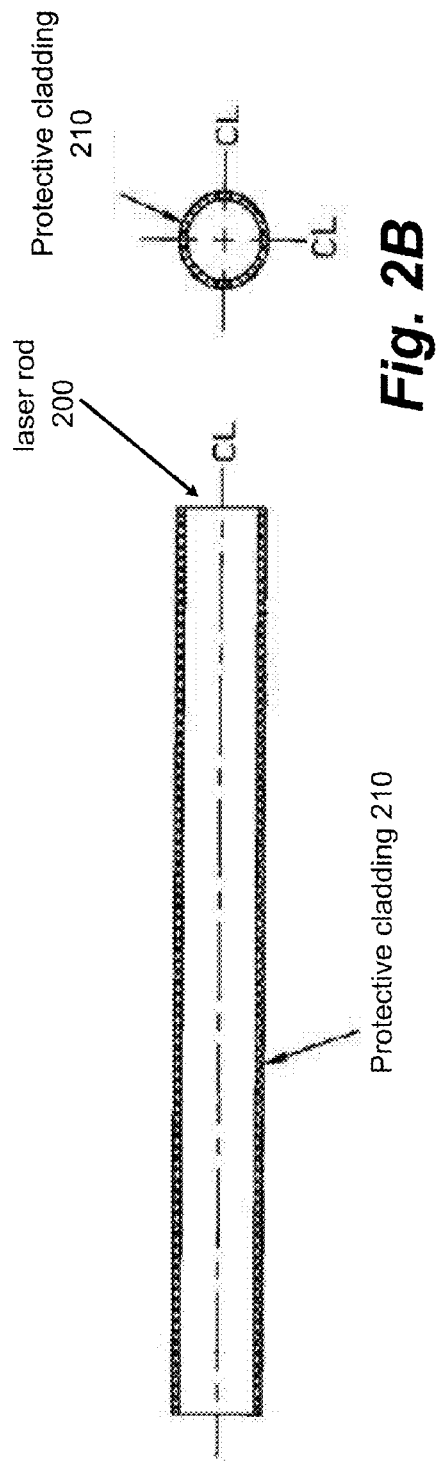
FIGS. 2A and 2B show another embodiment of the instant invention.

As shown in FIGS. 2A and 2B, in some embodiments, the optical active/gain medium can be laser crystal(s) (e.g., alexandrite (Cr: chrysoberyl) or alexandrite-like) in a form of a laser rod (200). In some embodiments, an entire outer surface (end-to-end) of the laser rod (200) can be cladded by a protective sheath/cladding (210). In some embodiments, a first portion of the outside surface (that is perpendicular to the longitudinal axis of the laser rod (200)) at a first end of the laser rod (200) and/or a second portion of the outside surface (that is perpendicular to the longitudinal axis of the laser rod (200)) at a second end of the laser rod (200) are not substantially cladded by the protective sheath/cladding (210).

In some embodiments, the protective sheath/cladding (or cladding) in the end portions of the laser rod can facilitate a mounting of the laser rod (2002) to maximize the optically active aperture.

In some embodiments, the protective sheath/cladding (210) has a composition of and is made/cladded in accordance to one or more principles of the instant invention discussed herein. In some embodiments, the instant invention provides an application of the protective cladding (210) to the laser rod (200) the by a vacuum cladding technology or any similarly suitable cladding and/or deposition technology. For example, in some embodiments in which the protective cladding (210) is made from glass or glass-like material(s), the application of such glass or glass-like material(s) to the laser rod (200) can be accomplished as follows. Initially, a tube is prepared from the desired glass or glass-like material(s) where the internal diameter of the glass tube is larger than the O.D. of the laser rod (200) so that at least a portion of the laser rod (200) can be positioned within the glass tube. Then, the glass tube is heated (e.g., by placing in a heating oven) so that the glass becomes semi-fluid. The semi-fluid glass is being drawn over the surface of the laser rod (200) (i.e., wetting the surface of the laser rod (200)) by applying vacuum from an opposite end of the laser rod (200). As semi-fluid glass is cooled, the protective cladding (210) is created over a desired surface area of the laser rod (200).

In some embodiments, the glass protective cladding (210) can be further fire polished and/or additionally finished to perform in accordance with the above described principle(s) of the instant invention. In some embodiments, the protective cladding (210) can be polished flush to the end faces.

In some embodiments, the laser rod (200), shown in FIGS. 2A and 2B, is protected from dissolution in aqueous solution (s) (e.g., water). In some embodiments, reflective losses of the laser rod (200), shown in FIGS. 2A and 2B, are reduced. In some embodiments, for the laser rod (200), shown in FIGS. 2A and 2B, the aperture (numerical aperture) is maximized. In some embodiments, the laser rod (200), shown in FIGS. 2A and 2B, is thermally isolated from a thermal transfer fluid.

Example 3

Figure 3:
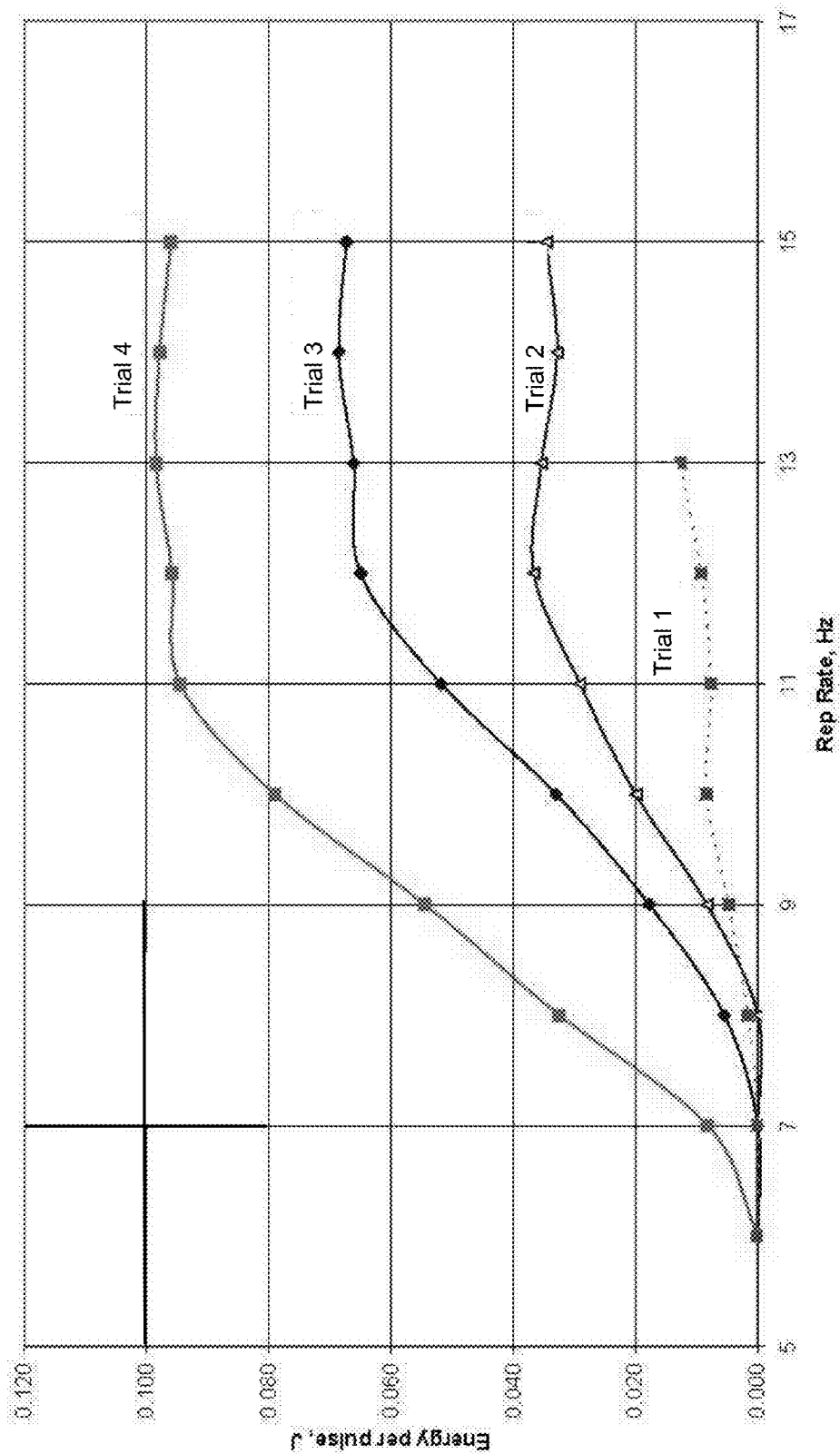
FIG. 3 shows a graph demonstrating results from testing some embodiments of the instant invention.

FIG. 3 shows a graph that compares results obtained during an operation of the conventional laser system at elevated temperatures above at least about 80 degrees Celsius with: (1) an alexandrite laser rod without the protective cladding of the instant invention and (2) alexandrite laser rods cladded with the protective cladding made from a glass-type material The alexandrite laser rod that was used for the study shown in FIG. 3 had a coefficient of expansion of about $6 \times 10^{-6}$ cm/cm/° C., and the protective cladding had the following properties:

i) a refractive index of 1.49, and
ii) a thermal expansion coefficient of about $56 \times 10^{-7}$ cm/cm/° C. between 0 and 300 degrees Celsius; and
iii) a thermal contraction coefficient of about $71 \times 10^{-7}$ cm/cm/° C. between 25 degrees Celsius and its setting point.

The results given in FIG. 3 indicate an improved performance of the laser rods of Examples 1 and 2 over the conventional laser rod (a control optical structure). Specifically, a greater output and a lower threshold are seen at 813 nm (nanometers). For example, an approximately 5-10 fold increase in an energy per pulse is observed, depending upon a repetition rate of the laser. The results shown in FIG. 3 are based on the following characteristics of a conventional flashlamp-pumped alexandrite laser system (the control) and laser systems of some embodiments of the instant invention:

1. cladded laser rods had cladded pump length of 95 mm;
2. the average thickness of the protective cladding was 0.5 mm;
3. uncladded laser rod (the control optical structure) had OD of 5 mm;
4. HR-1.5 m CX: Conventional High Reflector end of a laser cavity (optical cavity or optical resonator is an arrangement of mirrors that forms a standing wave cavity resonator for light waves), 1.5 m convex radius of the curvature, standard coating 720-800 nm—using a conventional mirror for such application, which takes into account properties of the laser cavity and rod;
5. OC-75% R, 6m CC: Conventional output coupler (output coupler (OC) is a partially reflective mirror(s) used in lasers to extract a portion of the laser beam from the optical resonator) that is 75% reflective, standard coating 720-800 nm with a 6 m concave partial mirror;
6. an aperture of 3.1 mm,
7. a cavity length of 40 cm for a typical alexandrite laser, and
8. energy was measured at 813 nm wavelength (extended range—i.e., beyond what is usually achievable with a standard laser system based on uncladded alexandrite optical medium (i.e., the control optical structure that is not designed and operated according to the instant invention)).

As FIG. 3 shows, Trial 1 (the $1^{st}$ line from the bottom of the chart (the bottom is a horizontal axis (Repetition Rate, Hz))) had a conventional setup (a conventional laser system with uncladded alexandrite optical medium), with input power at maximum: flashlamp's generated light with energy of 128 J/pulse; and the uncladded (control) laser medium generated output power at 12 Hz of about 0.01 J/per pulse—i.e., barely lasing.

As FIG. 3 shows, Trial 2 (the $2^{nd}$ line from the bottom of the chart) had a laser system in accordance with one embodiment of the instant invention (as described above in Examples 1 and 2), incorporating a cladded laser rod. In Trial 2, the flashlamp generated light with energy of 109 J/pulse; and the cladded laser medium generated output power of 0.035 J/pulse.

As FIG. 3 shows, Trial 3 (the $3^{rd}$ line from the bottom of the chart) had a laser system in accordance with another embodiment of the instant invention (as described above in Examples 1 and 2), incorporating a cladded laser rod. In Trial 3, the flashlamp generated light with energy of 117 J/pulse; and the cladded laser medium generated output power of 0.065 J/pulse.

As FIG. 3 shows, Trial 4 (the $4^{th}$ line from the bottom of the chart) had a laser system in accordance with yet another embodiments of the instant invention (as described above in Examples 1 and 2), incorporating a cladded laser rod. In Trial 4, the flashlamp generated light with energy of 128 J/pulse (maximum); and the cladded laser medium generated output power of 0.095 J/pulse. Consequently, the difference between Trial 1 and Trial 4 results in about a tenfold increase in power at 813 nm over the uncladded conventional laser rod (the control optical structure).

FIG. 3 additionally shows that the increased repetition rate can result in heating effects on the laser rod. That is, flashlamp's repetition rate up to about 13 Hz raised the temperature of the laser rod. With the protected laser rods (lines 2-4 from the bottom), the heat was maintained long enough, due to the insulation properties of the protective cladding, to result in the increased pumping efficiency, and, consequently, in the increased laser output.

Table 1 shows pulse duration (ns) versus pulse energy (mJ) for an alexandrite laser oscillator using a single pump chamber configured with: a) an unclad alexandrite laser rod (Column 2); and b) a cladded alexandrite laser rod (Column 3). The oscillator configurations are identical for the data recorded for Column 2 and Column 3 of Table 1, except for the laser rod. As seen in Table 1, for a given output energy the pulse duration is approximately 20-25% shorter for the configuration using the cladded alexandrite laser rod, compared with that using the unclad alexandrite laser rod.

TABLE 1

| Column 1<br>Pulse<br>Energy<br>(mJ) | Column 2<br>Pulse Duration (ns)<br>for Unclad Alexandrite<br>Laser Rod | Column 3<br>Pulse Duration (ns)<br>for Cladded Alexandrite<br>Laser Rod |
|---|---|---|
| 400 | 60 | 47 |
| 450 | 53 | 41 |
| 500 | 50 | 38 |
| 550 | 45 | 36 |
| 600 | 42 | 33 |
| 650 | 39 | 31 |

In some embodiments, the protective sheath/cladding is applied to optical crystals to protect them from the effects of immersion in fluids that are typically used in the operation of lasers and related optical devices and to alter the thermal profiles of these protected optical media.

In some embodiments, the protective cladding has properties, such as thermal expansion coefficients, that are identical or sufficiently similar that of the protected crystal. In some embodiments, the protective cladding has properties, such as surface adhesion properties such that the protective cladding/cladding seals or "wets" the surface of the protected crystal. In some embodiments, the wetting properties of the protective cladding can allow for creating a monolithic optical module for use in devices such as solid state lasers.

In some embodiments, the instant invention allows to protect water soluble crystals from the effects of water or other aqueous environment(s) when the operating conditions require optical crystal to be exposed to such environment(s).

In some embodiments, the instant invention allows to increase a lasing performance of optical gain media by providing the protective cladding that offers the thermal insulation for the optical gain media and/or optical index properties that substantially matches (identical or sufficiently similar) optical index properties of the protected optical gain media.

In some embodiments, the instant invention allows to enhance optical lasers by the optomechanical mounting of the protected optical media in such devices.

In some embodiments, where the lasing media is optically pumped, by, for example, flash lamps, diode, or LEDs, in a transverse configuration (i.e., the pump light must be transmitted through the protected before impinging on the laser medium, a composition of the protecting sheath/cladding needs to be transparent to the pump light at least in the spectral regions of the absorption (pump) bands of the laser medium).

In some embodiments, the instant invention can provide an optical structure that includes at least the following components: an optical active medium of a solid state laser, wherein the optical active medium has a first coefficient of thermal expansion; and at least one protective structure that is directly cladded at least a portion of an outside surface of the optical active medium, where the at least one protective structure has a second coefficient of thermal expansion which sufficiently matches the first coefficient of thermal expansion of the optical active medium of the solid state laser, and where the at least one protective structure is sufficiently transparent to at least one wavelength, wherein the at least one wavelength is within at least one absorption band of the optical active medium of the solid state laser; hereby resulting in the optical structure of the solid state laser having: i) the optical active medium of the solid state laser that is protected from a physical damage when the optical active medium of the solid state laser is heated to a temperature above 80 degrees Celsius, where the physical damage renders the optical active medium of the solid state laser inoperable, and ii) the optical active medium of the solid state laser that is capable of generating a laser beam having a first energy that is larger than a second energy generated by a control optical structure that includes the optical active medium of the solid state laser without the at least one protective structure.

In some embodiments, the at least one protective structure can be a thermal insulator. In some embodiments, the at least one protective structure can be sufficiently water-resistant at the temperature above 80 degrees Celsius. In some embodiments, the at least one protective structure seals at least one surface of the optical active medium of the solid state laser. In some embodiment, the at least one protective structure contacts an entire portion of the outside surface of the optical active medium of the solid state laser. In some embodiments, the at least one protective structure is created when at least one protective composition is deposited onto the optical active medium of the solid state laser.

In some embodiments, the at least one protective structure is created when at least one protective composition having a semi-fluid character wets the at least portion of the optical active medium of the solid state laser when the at least one protective composition is drawn over the at least portion of the optical active medium of the solid state laser. In some embodiments, the at least one protective structure includes at least one protective composition having one or more glass or glass-like properties.

In some embodiments, the optical active medium of the solid state laser includes a laser crystal. In some embodiments, the laser crystal can be selected from the group consisting of: alexandrite, Cr:LiSAF, Cr:LiCAF, Nd:YAG, NdCrYAG, Er:YAG, Nd:YLF, Ti:sapphire, Nd:YVO4, Nd:Y-COB, Nd:Glass, Tm:YAG, Yb:YAG, Ytterbium:2O3 (glass or ceramics), Ho:YAG, Cr:ZnSe, Promethium 147 doped phosphate glass (147Pm+3:Glass), Erbium doped and erbium-ytterbium codoped glass, U:CaF2, and Sm:CaF2.

In some embodiments, the instant invention can provide an optical system that at least includes an optical structure that includes at least the following components: an optical active medium of a solid state laser, wherein the optical active medium has a first coefficient of thermal expansion; and at least one protective structure that is directly cladded at least a portion of an outside surface of the optical active medium, where the at least one protective structure has a second coefficient of thermal expansion which sufficiently matches the first coefficient of thermal expansion of the optical active medium of the solid state laser, and where the at least one protective structure is sufficiently transparent to at least one wavelength, wherein the at least one wavelength is within at least one absorption band of the optical active medium of the solid state laser; hereby resulting in the optical structure of the solid state laser having: i) the optical active medium of the solid state laser that is protected from a physical damage when the optical active medium of the solid state laser is heated to a temperature above 80 degrees Celsius, where the physical damage renders the optical active medium of the solid state laser inoperable, and ii) the optical active medium of the solid state laser that is capable of generating a laser beam having a first energy that is larger than a second energy generated by a control optical structure that includes the optical active medium of the solid state laser without the at least one protective structure.

As detailed herein, some embodiments of the protective cladding of the instant invention can be primarily or exclusively applied for the purpose of providing thermal insulation of the laser medium, particularly for use with laser media, such as alexandrite, where the laser medium gain is temperature dependent.

As detailed herein, some embodiments of the protective cladding of the instant invention can be primarily or exclusively applied for the purpose of providing hydroscopic insulation of the laser medium.

In some embodiments of the instant invention, the protective cladding can be made from composition(s) that do(es) not include glass or glass-like material(s) but include other material(s) that exhibit one or more properties detailed above in the description of principles of the instant invention such as, but not limited to, thermal coefficients (e.g., coefficient of expansion) and/or optical properties that sufficiently match the analogous properties of the protected optical medium.

As detailed herein, in some embodiments, the instant invention allows to extend the useful tuning range of alexandrite optical media towards the Infrared spectrum, by raising, for example, (e.g., applying additional energy produced by the flashlamps) the operating point of the laser material above the boiling point of a first fluid (e.g., water) utilized to cool internal components of a laser system, such as flashlamps, as well as a second fluid (e.g., water) utilized to heat the laser rods in a conventional system.

As detailed herein, in some embodiments, the instant invention permits the laser gain medium to be pumped more vigorously (e.g., by flashlamps) than might otherwise be possible, so to the increase in the effective shock parameter of the cladded material produced by the protective cladding.

As detailed herein, in some embodiments, the instant invention allows to achieve the additional tuning range which is a result of increased energy absorption at elevated temperatures, and therefore a shift to longer wave output of the laser rods.

In some embodiments, the thickness of the protective cladding varies depending on characteristics of optical media and/or optical systems hardware that holds the protected optical medium. For example, as detailed herein, in some embodiments, the protective cladding can have an average thickness of 0.5 mm. In another examples, as detailed herein, the protective cladding can have an average thickness that is less than or more than about 0.5 mm, depending, for example, on whether the protective cladding can have sufficient strength (not to break) and provide sufficient thermal insulation for the optical medium to operate at an elevated temperature (e.g., in the case of alexandrite laser rod, the thickness of the protective cladding needs to be sufficient to protect the alexandrite laser rods above the boiling point of the water immersion).

In some embodiments, the thickness of the protective cladding can vary from about 0.1 mm to about 1 mm. In some embodiments, the thickness of the protective cladding can vary from about 0.1 mm to about 2 mm. In some embodiments, the thickness of the protective sheath/cladding can vary from about 0.5 mm to about 2 mm. In some embodiments, the thickness of the protective sheath/cladding can vary from about 1 mm to about 2 mm.

In some embodiments, where the protective cladding can be applied utilizing thin film deposition, which can be more on the order of 10-100 microns. In some embodiments, the thin film deposition of dielectric claddings can allow to waterproof the optical medium in situation when a thermal insulation is not critical.

In some embodiments, the thickness of the protective cladding can be selected based on one or more practical considerations such as optical system, shape and/or dimensions of the optical medium, output power, operating environment of the optical medium, etc.

While a number of embodiments of the present invention have been described, it is understood that these embodiments are illustrative only, and not restrictive, and that many modifications may become apparent to those of ordinary skill in the art. Specifically, for example, the use of glass or glass-like materials for the protective sheath/cladding is illustrative and does not exclude other material(s) and/or composition(s) that perform in accordance with one or more principles/embodiments of the instant invention as detailed herein. Further, while the instant invention is discussed in some embodiments with respect to laser crystals shaped as rods, it is understood that the instant invention can work for all gain media geometries, such as slabs or discs, not limited to rod geometries.

What is claimed is:

1. An optical laser structure, comprising:
a first laser crystal configured to be an optical active medium of a first solid state laser,
wherein the first laser crystal has a first coefficient of thermal expansion; and
at least one clad structure that is directly cladded at least a portion of an outside surface of the first laser crystal,
wherein the at least one clad structure has a second coefficient of thermal expansion which is sufficiently configured to match the first coefficient of thermal expansion of the first laser crystal of the first solid state laser,
wherein the at least one clad structure is sufficiently configured to thermally insulate the first laser crystal from a coolant of the first solid state laser when the first laser crystal is heated to a temperature above a coolant temperature of the coolant, and
wherein the at least one clad structure is sufficiently transparent such that a light passes, in sufficiently unchanged form, through the at least one protective structure to pump the first laser crystal; and
wherein having the at least one clad structure increases an energy of at least one laser beam generated by the optical laser structure of the first solid state laser when the first laser crystal is heated to the temperature above the coolant temperature of the coolant.

2. The optical structure of claim 1, wherein the first laser crystal is heated to the temperature at or above a nominal boiling point of the coolant.

3. The optical structure of claim 1, wherein the at least one clad structure seals at least one surface of the first laser crystal which, without the at least one clad structure, is in contact with the coolant.

4. The optical structure of claim 1, wherein the at least one clad structure directly contacts an entire portion of the outside surface of the first laser crystal.

5. The optical structure of claim 1, wherein the at least one clad structure comprises at least one clad composition that is configured to be deposited onto the first laser crystal.

6. The optical structure of claim 1, wherein the at least one clad structure comprises at least one clad composition having a semi-fluid character that is configured to:
 i) wet the at least portion of the first laser crystal upon application and
 ii) solidify upon cooling over the at least portion of the first laser crystal.

7. The optical structure of claim 6, wherein the first laser crystal has crystalline properties and wherein the at least one clad structure comprises at least one clad composition having one or more glass or glass-like properties.

8. The optical structure of claim 1, wherein the first laser crystal is water soluble.

9. The optical structure of claim 1, wherein the first laser crystal is selected from the group consisting of: alexandrite, Cr:LiSAF, Cr:LiCAF, NdCrYAG, Er:YAG, Nd:YLF, Ti:sapphire, Nd:YVO4, Nd:YCOB, Tm:YAG, Yb:YAG, Ytterbium:2O3 (ceramics), Ho:YAG, Cr:ZnSe, U:CaF2, and Sm:CaF2.

10. An optical system, comprising:
an optical structure, comprising:
a first laser crystal configured to be an optical active medium of a first solid state laser,
wherein the first laser crystal has a first coefficient of thermal expansion; and
at least one clad structure that is directly cladded at least a portion of an outside surface of the first laser crystal,
wherein the at least one clad structure has a second coefficient of thermal expansion which is sufficiently configured to match the first coefficient of thermal expansion of the first laser crystal of the first solid state laser,
wherein the at least one clad structure is sufficiently configured to thermally insulate the first laser crystal from a coolant of the first solid state laser when the first laser crystal is heated to a temperature above a coolant temperature of the coolant, and
wherein the at least one clad structure is sufficiently transparent such that a light passes, in sufficiently unchanged form, through the at least one protective structure to pump the first laser crystal; and
wherein having the at least one clad structure increases an energy of at least one laser beam generated by the optical laser structure of the first solid state laser when the first laser crystal is heated to the temperature above the coolant temperature of the coolant.

11. The optical system of claim 10, wherein the first laser crystal is heated to the temperature at or above a nominal boiling point of the coolant.

12. The optical system of claim 10, wherein the at least one clad structure directly contacts the first laser crystal which, without the at least one clad structure, is in contact with the coolant.

13. The optical system of claim 10, wherein the at least one clad structure seals at least one surface of the first laser crystal which, without the at least one clad structure, is in contact with the coolant.

14. The optical system of claim 10, wherein the at least one clad structure directly contacts an entire portion of the outside surface of the first laser crystal.

15. The optical system of claim 10, wherein the at least one clad structure comprises at least one clad composition that is configured to be deposited onto the first laser crystal.

16. The optical system of claim 10, wherein the at least one clad structure comprises at least one clad composition having a semi-fluid character that is configured to:
 i) wet the at least portion of the first laser crystal upon application and ii) solidify upon cooling over the at least portion of the first laser crystal.

17. The optical system of claim 16, wherein the first laser crystal has crystalline properties and wherein the at least one clad structure comprises at least one clad composition having one or more glass or glass-like properties.

18. The optical system of claim 10, wherein the first laser crystal is water soluble.

19. The optical system of claim 10, wherein the first laser crystal is selected from the group consisting of: alexandrite, Cr:LiSAF, Cr:LiCAF, NdCrYAG, Er:YAG, Nd:YLF, Ti:sapphire, Nd:YVO4, Nd:YCOB, Tm:YAG, Yb:YAG, Ytterbium: 2O3 (ceramics), Ho:YAG, Cr:ZnSe, U:CaF2, and Sm:CaF2.

* * * * *